United States Patent [19]

Haendle et al.

[11] 4,423,521
[45] Dec. 27, 1983

[54] DIAGNOSTIC X-RAY INSTALLATION COMPRISING A CONTROL LOOP FOR THE EXPOSURE CONTROL

[75] Inventors: Joerg Haendle, Erlangen; Wolfgang Maass, Nuremberg, both of Fed. Rep. of Germany

[73] Assignee: Siemens Aktiengesellschaft, Berlin & Munich, Fed. Rep. of Germany

[21] Appl. No.: 343,535

[22] Filed: Jan. 28, 1982

[30] Foreign Application Priority Data

Feb. 23, 1981 [DE] Fed. Rep. of Germany ....... 3106627

[51] Int. Cl.³ ............................................. G03B 41/16
[52] U.S. Cl. ...................................... 378/108; 378/99
[58] Field of Search ................................. 378/108, 99

[56] References Cited

U.S. PATENT DOCUMENTS 4,240,109 12/1980 Michael et al. .

FOREIGN PATENT DOCUMENTS 1956070 3/1980 Fed. Rep. of Germany .
1018935 2/1966 United Kingdom .

Primary Examiner—Craig E. Church
Attorney, Agent, or Firm—Hill, Van Santen, Steadman & Simpson

[57] ABSTRACT

An exemplary embodiment comprises an image intensifier television chain which includes an X-ray image intensifier, an optical coupler, a camera tube, a video amplifier, and a monitor, and also has a control loop for exposure control which includes a control circuit for the formation of a control voltage for controlling the dose rate of the x-ray tube. A dominant-field-responsive circuit evaluates the video signal and includes a device for blanking-out portions of the video signal for the formation of a dominant field. An actual value transmitter is connected in circuit between the photocathode of the X-ray image intensifier and a high voltage generator therefor, so as to supply to the control circuit an actual value signal corresponding to the mean image brightness. In the control circuit, the actual value signal and the output signal of the dominant-field-responsive circuit are combined as a correction for the dose rate setpoint value signal, so that the dose rate is controlled in accordance with a selected portion of the video signal corresponding with a desired dominant portion of the image field.

10 Claims, 1 Drawing Figure

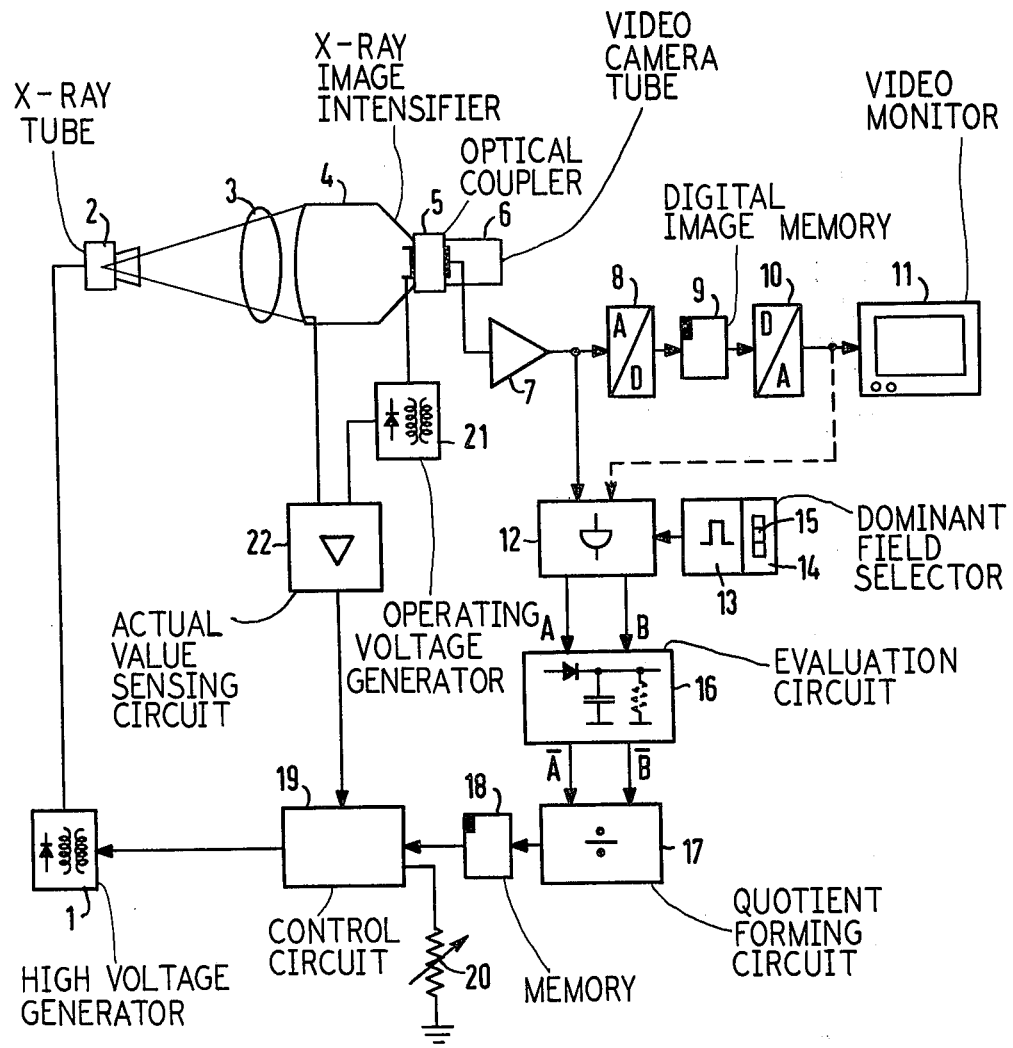

DIAGNOSTIC X-RAY INSTALLATION COMPRISING A CONTROL LOOP FOR THE EXPOSURE CONTROL

BACKGROUND OF THE INVENTION

The invention relates to a diagnostic X-ray installation comprising an image intensifier television chain which includes an X-ray image intensifier, an optical coupler, a camera tube, a video amplifier and a monitor, and comprising a control loop for exposure control which includes a setpoint value transmitter, a control circuit for the formation of a control voltage for controlling the dose rate of the X-ray tube and a dominant field selection circuit which contains an evaluation circuit and a device for blanking out parts of the video signal for the formation of a dominant field.

In German Pat. No. 1,194,070, a diagnostic X-ray installation of this type is described. The video signal is supplied, in the control loop, to the evaluation circuit which effects an intergration of the signal. In a circuit arrangement the integrated signal is compared with a selected setpoint value. An electronic switch, controlled by the line-scanning frequency of the video signal, allows only the portion of the video signal to pass through which corresponds to the desired dominant field. The resulting partially blanked out signal is supplied to the control circuit which effects an adjustment of the radiographic values. A control of this type is comparatively sluggish. It can be employed only for fluoroscopy operation.

In the German OS No. 2,746,285 an installation for the suppression of picture noise is described in which several pictures are superimposed. If this installation is employed in a diagnostic X-ray installation for the suppression of quantum noise in the case of low dose rates, the described control cannot be applied since no control signal can be obtained from the superimposition of several pictures for the control of the brightness of individual pictures.

From the German Pat. No. 1,956,070, exposure control on the basis of the measurement of the photocathode current of the X-ray image intensifier is known. This control installation renders possible a rapid exposure control. However, since the inlet fluorescent screen of the X-ray image intensifier receives the entire radiograph, the photocathode current represents only the mean value of the image brightness, so that no dominant can be formed from this signal.

SUMMARY OF THE INVENTION

The invention proceeds from the objective of producing as generic diagnostic X-ray installation which renders possible a rapid exposure control taking into account the dominant and the surrounding field.

In accordance with the invention, the object is achieved in that an actual value transmitter is present which supplies to the control circuit an actual value signal corresponding to the mean image brightness, and that, in the control circuit, the actual value signal, the setpoint value signal, and the output signal of the dominant field selection circuit are superimposed to form a resultant correction value for representing the desired control value based on the brightness of the selected dominant field. The exposure is hereby controlled on the basis of the magnitude of the actual value signal, whereby a taking into account of the dominant proceeds through a correction value blanked out of the video signal.

The actual value signal can be obtained simply if the actual value transmitter is connected with the photocathode of the X-ray image intensifier and with its high voltage generator. A simple circuit construction for dominant field selection can be obtained if the apparatus contains a gate circuit which is connected with the video amplifier and if a pulse generator is connected to the gate circuit which generates pulses for the blanking-out of the dominant field, and which is connected with a select device for the selection of the size of the dominant field and thus of the pulse width of the pulses generated by the pulse generator. It has proven expedient if the evaluation circuit is connected to the gate circuit. A taking into account of various image parts can take place if the gate circuit has two outputs to which are connected a signal blanked out of the video signal, corresponding to the dominant field, and a signal corresponding to the surround field. It has proven advantageous if the surround field comprises the entire remaining image field. An alternative solution is achieved if the gate circuit has two outputs to which a signal blanked out of the video signal, corresponding to the dominant field, and a signal corresponding to the entire image field, are connected. The evaluation circuit can be so designed that it provides an output which is a function of either the mean value or the peak value of the input signal. The correction value can be formed from both obtained signals if the evaluation circuit is connected with an arithmetic circuit which forms the signal ratio of averaged or maximum output signals of the evaluation circuit, and if the output signal of the arithmetic circuit is supplied to the control circuit as a correction value for correcting the value selected at the setpoint value transmitter. Signals can be employed for the radiograph which were obtained during fluoroscopy if a memory is inserted between the arithmetic circuit and the control circuit.

The invention shall be explained in the following on the basis of an exemplary embodiment illustrated on the accompanying drawing sheet; and other objects, features and advantages will be apparent from this detailed disclosure and from the appended claims.

BRIEF DESCRIPTION OF THE DRAWING

The signal FIGURE is a circuit diagram for illustrating an embodiment in accordance with the present invention.

DETAILED DESCRIPTION

In the FIGURE, an X-ray diagnostic installation comprising a high voltage generator 1 is illustrated which supplies an X-ray tube 2. The rays emitted by the X-ray tube 2 penetrate a patient 3 and generate a radiation image on the inlet fluorescent screen of an X-ray image intensifier 4. The image of the output fluorescent screen of the X-ray image intensifier 4 is transmitted via an optical coupler 5 to a camera tube 6. The voltage tapped on the target of the camera tube is amplified in a video amplifier 7 and supplied to an analog-to-digital converter (A/D-converter) 8 which digitizes the analog video signals and supplies them to an image memory 9. The output of the image memory 9 is connected via a digital-to-analog converter (D/A-converter) 10 with a monitor 11.

The video signal of the video amplifier 7 is also supplied to a gate circuit 12 which effects an electronic blanking out. From a pulse generator 13, which also generates the synchronization pulses of the television chain, dominant-field-selection pulses are supplied to the gate circuit 12, the position and magnitude of said pulses being controlled by the actuation of a key of a keyboard 15 secured to a select device 14. These dominant-field-selection pulses control the switching state of the gate circuit 12. The partially blanked-out signal A, corresponding to the dominant field, is supplied at the first output of the gate circuit 12. At the second output a signal B is supplied, corresponding either to the dominant-surround field (which surrounds the dominant field) or to the entire image (including the dominant field). Both signals are supplied to an evaluation circuit 16 which either forms the peak value or, (as illustrated by the shunt resistor shown in block 16 with broken lines), the mean value of the signals. These two newly formed signals $\overline{A}$ and $\overline{B}$ (namely the dominant-field-responsive signal and the surround or complete-image field signal, as processed by evaluation circuit 16) are supplied to an arithmetic circuit 17 which forms the quotient of the processed dominant field signal $\overline{A}$ and the correspondingly processed dominant-surround field or image field signal $\overline{B}$. This quotient can be intermediately stored in a memory 18 or can be supplied directly to a control circuit 19 for the purpose of setpoint value correction. Via a setpoint value transmitter 20, likewise connected to the control circuit 19, the setpoint value S to be corrected can be selected.

The high voltage generator 21, generating the operating voltages of the X-ray image intensifier 4, is connected directly with the anode of the X-ray image intensifier 4, and is connected via an actual value transmitter 22, with the photocathode. The actual value transmitter 22 measures the current of the photocathode and delivers a signal I, proportional to this measured value, to the control circuit 19. The control circuit 19 compares this actual value I with the setpoint value S, with the correction value of the arithmetic circuit 17 being superimposed thereon. The control circuit 19 is connected with the X-ray high voltage generator 1 and alters, in dependence upon the input values, the electric values determining the exposure.

The control signal R supplied by the control circuit 19 is formed from the setpoint value S of the setpoint value transmitter 20, from the actual value I of the actual value transmitter 22, and from the quotient of the signals $\overline{A}$ and $\overline{B}$ for the dominant field and dominant-surround field. This can be expressed by a formula in the following fashion:

$$R = S - \left( K \cdot I \cdot \frac{\overline{A}}{\overline{B}} \right)$$

This equation states the following:

The control signal R results from the setpoint value S, from which a value is subtracted which results from a constant K multiplied with the actual value I and with a quotient which is formed from the dominant field signal $\overline{A}$ divided by the image field signal $\overline{B}$.

The constant K effects an adaptation of the values to one another. Since the setpoint value S supplied by the setpoint value transmitter 20 is freely selectable in its value, this constant K can be dispensed with given a correct selection of the remaining values.

If e.g. the dominant field signal $\overline{A}$ is increased, then there is also proportionally a slight increase in the image field signal $\overline{B}$ and the actual value I which represent the mean value of the brightness of the entire image. In the case of a constant setpoint value, thus a negative control signal R results which is supplied to the high voltage generator 1 and effects a decrease of the X-ray parameters until the brightness of the selected dominant field corresponds to the desired brightness selected by means of the setpoint value transmitter 20. If, by contrast, the image field signal $\overline{B}$ is increased, then the actual value I is increased proportionally, so that the control signal R remains equal to zero.

If the signals supplied by the video amplifier 7 are too low to be able to effect a satisfactory formation of the correction value, the video signal can be integrated and stored in the image memory 9 over several television pictures. In this case it is expedient to employ the output signal of the image memory 9 for the determination of the quotient of the dominant field signal $\overline{A}$ and image field signal $\overline{B}$, such output signal, as is illustrated in broken lines, being tapped at the output of the D/A-converter 10. This tap of the output signal of the image memory 9 can likewise be employed if, instead of continuous fluoroscopy, an "electronic immediate image" (stored television-single picture) is employed.

As the actual value for rapid exposure control, the magnitude of the photocathode current of the image intensifier 4 is employed which very rapidly follows a radiation intensity change. From the video signal a correction value is obtained which corresponds either only to the mean brightness in the dominant field or to the quotient of the mean intensity of dominant field to dominant-surround field. Through the superimposition of the three values, the setpoint value, the actual value, and the correction value, a rapid exposure control can take place which renders possible an evaluation of the dominant.

Through the storage of the correction value in the memory 18 it is possible to employ this circuit arrangement also in the case of indirect radiographs taken from the displayed image on the monitor 11. In this case, the correction value is obtained during the fluoroscopy and read into the memory 18. During subsequent brief X-ray exposure the radiographic values are determined by the photocathode current and the stored dominant value.

The actual value can be determined from the output signal of a photomultiplier which, like the photocathode, rapidly follows the radiation intensity and exhibits a behavior integrated over the entire image.

It will be apparent that many modifications and variations may be effected without departing from the scope of the novel concepts and teachings of the present invention.

We claim as our invention:

1. A diagnostic X-ray installation comprising an X-ray tube, an image intensifier television chain which includes an X-ray image intensifier (4), an optical coupler (5), a camera tube (6), a video amplifier (7), and a monitor (11), and comprising a control circuit for exposure control which includes a control circuit (19) for the formation of a control voltage for controlling the dose rate of the X-ray tube, a setpoint value transmitter (20) for supplying a setpoint value signal, and circuit means (12 through 18) comprising an evaluation circuit (16) and a device (12 through 15) for blanking out portions of the video signal to supply an output signal for representing a dominant field, characterized in that an actual value transmitter (22) is present which supplies to the control circuit (19) an actual value signal corresponding to the mean image intensity, and that, in the control circuit (19), the actual value signal, the setpoint value signal, and the output signal of the circuit means (12 through 18) are superimposed to form a resultant correction value.

2. A diagnostic X-ray installation according to claim 1, characterized in that the X-ray image intensifier has a photocathode and an operating voltage generator, the actual value transmitter (22) being connected with the photocathode of the X-ray image intensifier (4) and with said operating voltage generator (21).

3. A diagnostic X-ray installation according to claim 1, characterized in that the device (12 through 15) comprises a gate circuit (12) which is connected with the video amplifier (7), and that a pulse generator (13) is connected to the gate circuit (12) which generates pulses for delineating the dominant field, a dominant field selection device being coupled with said pulse generator (13) for the selection of the size of the dominant field and for controlling the pulse width of the pulses generated by the pulse generator in accordance with the selected size of the dominant field.

4. A diagnostic X-ray installation according to claim 3, characterized in that the evaluation circuit (16) is connected to the gate circuit (12).

5. A diagnostic X-ray installation according to claim 3, characterized in that the gate circuit (12) has respective outputs for supplying a first signal (A) selected from the video signal to correspond to the dominant field, and a second signal (B) corresponding at least to the surround field.

6. A diagnostic X-ray installation according to claim 3, characterized in that the gate circuit (12) has respective outputs for supplying a first signal (A) selected from the video signal to correspond to the dominant field, and a second signal (B) corresponding to the entire image field.

7. A diagnostic X-ray installation according to claim 5, characterized in that the evaluation circuit (16) is so designed that it forms a mean value of the first and second signals (A, B).

8. A diagnostic X-ray installation according to claim 5, characterized in that the evaluation circuit (16) is so designed that it forms the peak value of the first and second signals (A, B).

9. A diagnostic X-ray installation according to claim 5, characterized in that an arithmetic circuit (17) forms the signal ratio of the output signals ($\overline{A}, \overline{B}$) of the evaluation circuit, and that the output signal of the arithmetic circuit (17) is supplied to the control circuit (19) as a correction value for correction of a setpoint value selected at the setpoint value transmitter.

10. A diagnostic X-ray installation according to claim 9, characterized in that a memory (18) is inserted between the arithmetic circuit (17) and the control circuit (19).

* * * * *